Aug. 17, 1971         F. A. KARS         3,600,478
SIMULTANEOUS PREPARATION OF UREA GRANULES OF TWO SIZES
Filed May 8, 1969                     3 Sheets-Sheet 1

INVENTOR
FRANCISCUS A. KARS

United States Patent Office 3,600,478
Patented Aug. 17, 1971

3,600,478
SIMULTANEOUS PREPARATION OF UREA GRANULES OF TWO SIZES
Franciscus A. Kars, Beukenboomweg 8, Sittard, Netherlands
Filed May 8, 1969, Ser. No. 822,882
Int. Cl. B01j *2/02*
U.S. Cl. 264—8
2 Claims

ABSTRACT OF THE DISCLOSURE

There is provided a process for the preparation of urea granules, so-called prills. Drops of liquid urea are allowed to solidify to granular product during a free fall with direct cooling. The drops of liquid urea supplied from a perforated rotary vessel are solidified during the free fall in the presence of urea drops from a second perforated rotary vessel, the perforations in which have such a diameter that the mean diameter of the drops issuing from it is at most half that of the former drops. The solidified droplets are collected together and classified according to size. If two types of urea prills are produced, urea of different biuret contents can be supplied to each of the rotary vessels.

---

Figure 1:
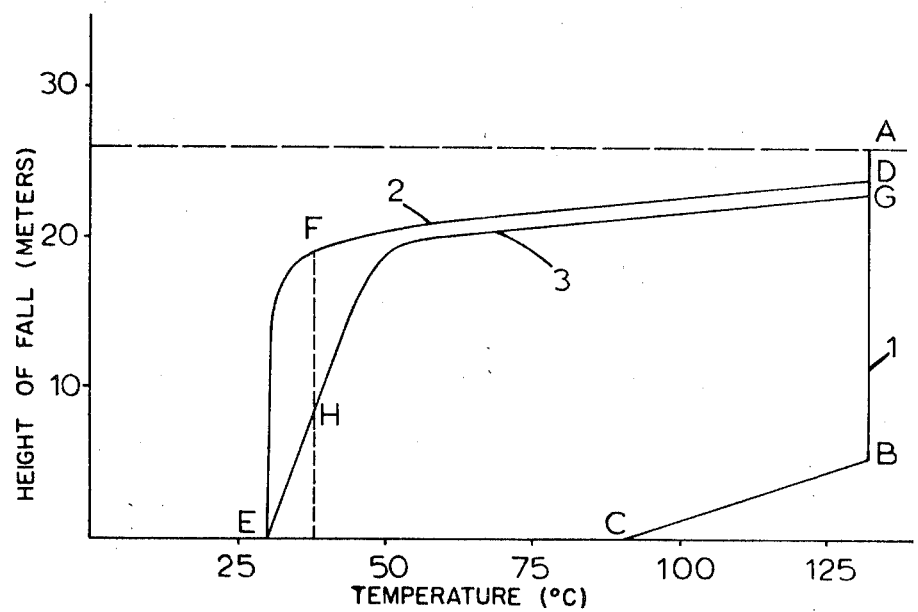

The invention relates to a process for preparing urea granules, or "prills," by solidifying drops of liquid urea to granules during a free fall in which they are exposed to direct cooling.

In the realization of this known process, liquid urea is supplied to a rotary vessel with perforated sidewall. Under the influence of the centrifugal force, urea drops are flung out into the surrounding space, where they fall down freely. Normally, this is done in a shaft-like construction, such as a tower, through which a counter-flow of cooing agent—mostly air—is passed at such a rate that sufficient heat of solidification is withdrawn from the granules to enable them to solidify rapidly. The installation for executing this procedure is so dimensioned that the drops reach the bottom in the solidified state, and are still rather hot whilst being discharged from there. The preparation of large granules, further to be referred to as "prills," calls for a greater height of fall than is needed for making small prills under otherwise identical conditions, because large drops have a higher rate of fall and because, with their relatively smaller cooling surface area, they transmit the heat of solidification less rapidly to the cooling air than an equally large quantity by weight of small drops. It is further essential that the prills do not decrease too much in temperature, because, otherwise, they may absorb too much moisture; this is especially liable to occur when the cooling air has a high relative humidity, as may be the case in hot regions.

The production costs for urea prills depend on the required biuret content; the costs are higher as the biuret content must be lower, because a low biuret content calls for additional purification, such as crystallisation treatment. The admissible biuret content of urea prills, in its turn, depends on the field of application. For example, whereas fertilizer urea must have a low biuret content, the urea to be added to cattle feed may be much richer in biuret. The size of the prills, as well as their biuret content, is usually varied in dependence of the application. For example, whereas fertilizer prills have an average diameter of 1.7 mm. and a biruet content of 0.3% by weight or less, prills to be used as a feed additive are made with an average diameter of 0.6 mm. and a biruet content of 1% by weight or over.

So far, urea prills of different types—by which is meant here urea prills differing in size and, though not necessarily, in composition, e.g. in biruet content—have been prepared either simultaneously in separate towers, or successively in one and the same tower.

A special drawback of the former alternative is that t calls for high investments and that the operating and maintenance costs for two installations are higher than those for a single one.

The drawbacks of the latter alternative are the following:

(1) As regards height of fall, volume of cooling air to be used and required final temperature of the prills, the installation should be so dimensioned as to be suited for production of the larger prills. All other conditions being the same, smaller prills are cooled down much lower in this tower, to the extent that water may be absorbed from the atmosphere. If less cooling air is supplied to effect more moderate cooling of the prills, the final temperature of the cooling air, being high in that case, may give rise to complications with regard to the mechanical components of the installation in the upper part of the tower. If much cooling air of a higher initial temperature is supplied, the prills will leave the installation with a higher temperature, but this involves a much larger loss of heat. For this reason, preheating of the cooling air is not justified economically; and (2) Preparation of different types of prills in succession gives rise to stoppages, because the installation has to be repeatedly changed, while the discontinuous production per type creates the need for larger storage facilities to be used as a buffer space for the type that is not being made.

The abovementioned drawbacks may be entirely obviated if, in conformity with the invention, drops of liquid urea supplied from a perforated rotary vessel are allowed to solidify during their free fall in the presence of urea drops from a second perforated rotary vessel, the perforations in which have such a diameter that the mean diameter of the drops issuing from it is at most half that of the former drops, and the solidified drops are collected jointly, and subsequently classified according to size.

Advantages of the process according to the invention are the following:

(1) The larger prills reach the bottom of the installation with a relatively high temperature, say 90° C., with the result that the entering cooling air is heated and, in consequence, the small prills are cooled down less rapidly, which is desirable. This means that cooling air is preheated without supply of additional heat;

(2) The small prills indeed reach the bottom of the installation with so low a temperature that moisture may be taken up from the atmosphere, but this temperature is reached only towards the end of the free fall, so that only little time is left for absorption of moisture.

(3) The large and the small prill types are collected on the bottom of the installation in a thoroughly mixed state, with the result that prills will immediately exchange heat. The small and too deeply cooled prills are heated up so high as to release the water absorbed towards the end of their free fall. A further advantage is that the larger prills are rapidly cooled.

(4) The two types of prills differ so much in diameter that they can be readily separated according to size, for example by screening; and (5) Since a sharp separation can be made between the particle fractions, urea prills of different composition may, if desired, be prepared simultaneously in the same installation.

The invention also relates to an installation for the simultaneous production of two types of urea prills in one tower provided with facilities for the transport of cooling agent and an installation for collecting and discharging the prills formed. For that purpose two rotatable perforated vessels, each provided with means for rotating them, and for supplying the liquid urea, are mounted in the tower at a vertical distance of not more than a few meters from each other, the diameter of the perforations in the one vessel being at most half of that in the other vessel, and the discharging installation being provided with a unit for classifying the collected prills.

For realizing the process according to the invention it is desirable to collect the large and the small prills together, which means that they must be made to reach the bottom of the installation in the mixed state. The paths traversed by the large and small prills during their fall must therefore be approximately identical. This can be achieved by producing the large and small prills by means of separately rotatable vessels. The speed of rotation of each vessel should be so adjusted that the drops to be solidified will travel through approximately identical paths.

As the perforated vessels are each provided with means for supplying liquid urea, the vessels may, if so desired, be fed with urea streams of different biuret contents. For example, a melt of urea crystals purified by recrystallisation, may be supplied to the vessel forming the large prills, and a non-purified urea melt to the other.

Figure 2:
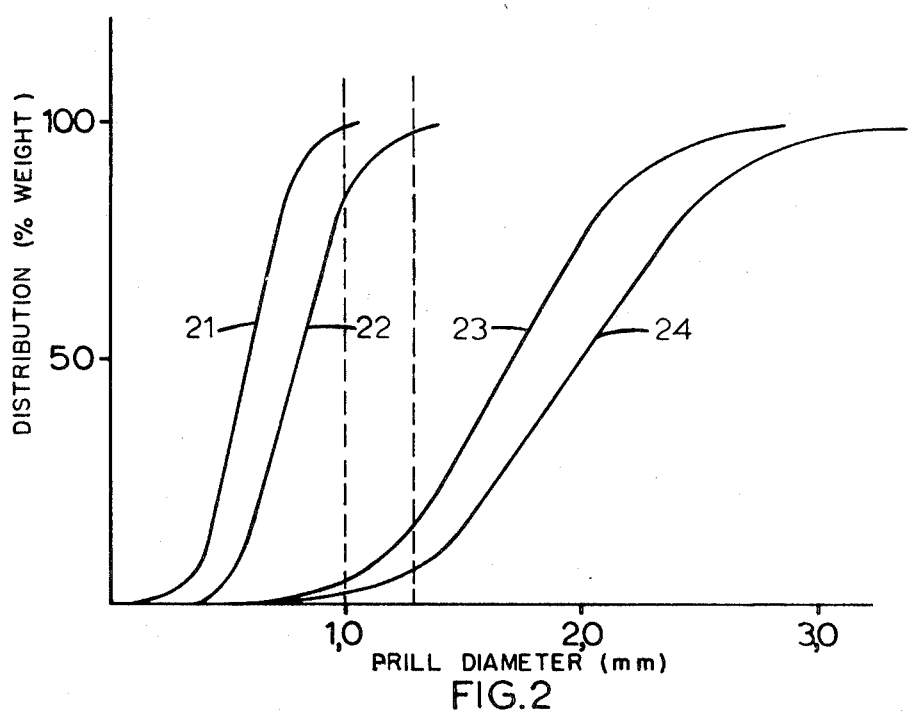
Figure 3:
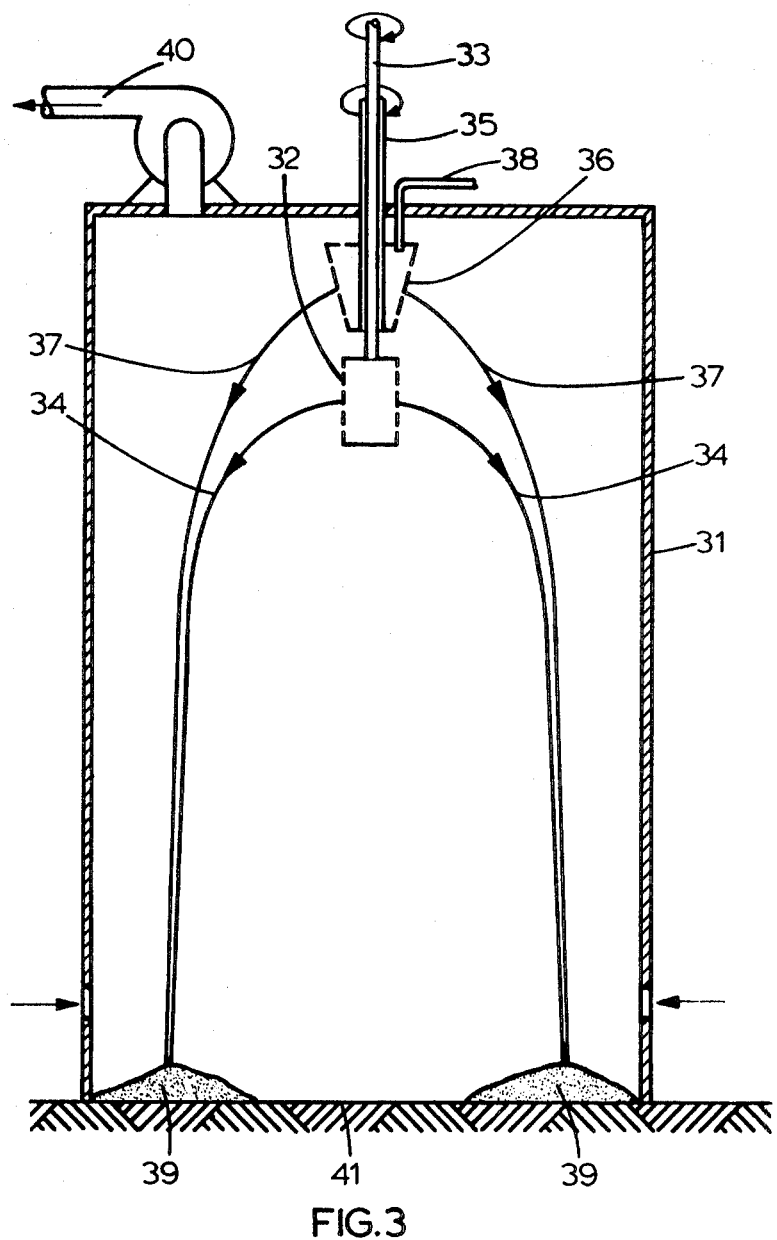

The invention will be elucidated with reference to the drawing. Here,

FIG. 1 shows the relation between temperature and height of fall of the urea drops to be solidified, FIG. 2 shows the cumulative sieve curves for solidified urea drops of different diameters, FIG. 3 is a schematic representation of an installation for realizing the process according to the invention.

The graphical representations relate to the preparation of urea prills over an effective height of fall of 26 metres in a tower of 12 m. diameter. The hourly output is 9 tons of prills with an average diameter of 1.7 mm. and 4.5 tons of prills with an average diameter of 0.6 mm. The counterflow of cooling air passed through at the rate of 100,000 m.$^3$ per hour has an inlet temperature of 28° C. and is saturated with water vapour at said temperature. These data exclusively serve to elucidate the invention and should not be taken as limitary.

The graphical representation in FIG. 1 shows the temperature variation of free-falling urea drops. The temperature—in degrees centigrade—of urea drops, solidified or still liquid, is plotted on the horizontal axis, the vertical axis showing the height of fall in metres.

Line 1 denotes the temperature variation of free-falling urea drops of 1.7 mm. average diameter. These droplets solidify over trajectory AB, which measures over 20 m. in length. Passing through trajectory BC, which is nearly 6 m. long, the solidified droplets cool down from the solidifying temperature of 132° C. to the final temperature of 90° C. If the droplets of 0.6 mm. average diameter are allowed to fall freely over the same height (line 2), they will solidify in the trajectory AD, which is only 2 m. long, and, in travelling through trajectory DE, which measures 24 m. in length, cool down to just above the temperature of the entering cooling air; the final temperature in the example is appr. 30° C. At F, after a drop of 7 m., the point is reached where the vapour pressure of the water in the urea prills become equal to, or lower than, the water vapour pressure of the saturated cooling air, so that the prills formed have the opportunity to absorb water over a height of fall of appr. 19 m.

Curve 3 shows how the temperature of prills of 0.6 mm. average diameter varies when these are prepared simultaneously with prills of appr. 1.7 mm. average diameter. Solidification of the small droplets now takes place over trajectory AG (3 m. in length), after which the prills cool down further until at point E they have reached the final temperature of appr. 30° C. In this case the prills drop over the 17 m. long trajectory AH, at the end of which the vapour pressures of the water in the prills and the cooling air have become equal. The prills formed now have an opportunity to absorb water only over a height of fall of appr. 9 m. In this case prills of 90° C. on the tower bottom moreover exchange heat with prills of 30° C., which, under the conditions of the example, results in a final temperature of appr. 70° C. At this temperature the small prills no longer take up any water, they even release the water previously absorbed.

FIG. 2 is a graphical representation of cumulative sieve curves. The prill diameter in mm. is plotted on the horizontal axis, the vertical axis showing the contribution, in percent by weight, to a given size fraction. Curve 21 is the cumulative sieve curve of prills with an average diameter of 0.6 mm.; 22 is the corresponding curve for prills of 0.8 mm. average diameter; 23 for prills of 1.7 mm. average diameter and 24 for prills of 2.0 mm. average diameter.

Prills with average diameters of 0.6 and 1.7 mm. can be separated almost completely by screening at 1.0 mm.; prills with average diameters of 0.8 and 2.0 mm. can be sharply separated by screening at 1.3 mm. The graphical representation in FIG. 2 consequently shows that in the simultaneous production of urea prills of different types, notably of prills differing in diameter and, if so desired, also in biuret content, a separation between the types can very readily be effected if the diameter of the small prills is at most half that of the large prills.

FIG. 3 is a schematic illustration of an installation for realizing the process according to the invention. In the top of prill tower 31 a perforated rotatable vessel 32 is installed to which the urea can be supplied via the hollow drive shaft 33. By means of this vessel small prills can be formed, which, during their fall, travel through trajectory 34. Mounted concentrically around drive shaft 33 is another drive shaft 35 for a second perforated vessel 36, by means of which large prills can be formed, which, during their fall, travel through a trajectory 37. This vessel receives the liquid urea through line 38. The two types of prills 39 thus formed drop onto the bottom 41 of tower 31, from where they are discharged in the customary way (not shown). The required cooling air is aspirated by a fan 40. Finally, the prills can be classified according to size in the usual manner, e.g. by screening. If desired, urea of high biuret content may be supplied to vessel 32 via hollow shaft 33, while urea of low biuret content may be fed to vessel 36 via line 38. The hollow shaft 33 and the drive shaft 35 may be driven in the customary way, each at the desired speed.

What is claimed is:

1. A process for prilling urea of two sizes simultaneously in one tower, comprising:
   (a) introducing molten urea into a first perforated rotary vessel within said tower,
   (b) introducing molten urea into a second perforated rotary vessel positioned coaxially below said first rotary vessel,
   (c) rotating each of said vessels at a speed to centrifugally form drops traveling through approximately identical paths in said tower upon free fall therein, said perforations in said second vessel having a diameter that the mean diameter of drops therefrom are at most half the mean diameter of the drops from said first vessel, (d) cooling and solidifying the drops from said vessels to form prills thereof during free fall of the drops from said first vessel in the presence of the drops from said second vessel through an upwardly flowing stream of cooling air, wherein heating of said air stream by the drops from said first vessel reduces the cooling of the drops from said second vessel, and (e) collecting and classifying said formed prills.

2. Process as claimed in claim 1 wherein liquid urea of different biuret contents is supplied to each of said vessels.

References Cited

UNITED STATES PATENTS

| 3,055,049 | 9/1962 | Bruyne et al. | 264—13 |
| 3,059,280 | 10/1962 | Laehder | 264—14 |
| 3,130,225 | 4/1964 | Friend | 264—14 |
| 3,446,877 | 5/1969 | Endler | 264—8 |

ROBERT F. WHITE, Primary Examiner

J. R. HALL, Assistant Examiner

U.S. Cl. X.R.

264—13

UNITED STATES PATENT OFFICE
CERTIFICATE OF CORRECTION

Patent No. 3,600,478      Dated    August 17, 1971

Inventor(s)   Franciscus A. Kars

It is certified that error appears in the above-identified patent and that said Letters Patent are hereby corrected as shown below:

In the heading to the printed specification, after line 5, insert -- assignor to Stamicarbon N.V., Heerlen, Netherlands --.

Signed and sealed this 22nd day of February 1972.

(SEAL)
Attest:

EDWARD M. FLETCHER, JR.           ROBERT GOTTSCHALK
Attesting Officer                 Commissioner of Patents